Aug. 16, 1966

T. W. KALBOW 3,266,133

APPARATUS FOR DISPENSING AND ASSEMBLING
OPEN RINGS TO GROOVED SHAFTS

Filed Jan. 26, 1965

INVENTOR.
THEODORE W. KALBOW by A. C. Schwarz, Jr.
ATTORNEY

Aug. 16, 1966   T. W. KALBOW   3,266,133
APPARATUS FOR DISPENSING AND ASSEMBLING
OPEN RINGS TO GROOVED SHAFTS
Filed Jan. 26, 1965   5 Sheets-Sheet 3

Aug. 16, 1966  T. W. KALBOW  3,266,133
APPARATUS FOR DISPENSING AND ASSEMBLING
OPEN RINGS TO GROOVED SHAFTS
Filed Jan. 26, 1965  5 Sheets-Sheet 4

United States Patent Office 3,266,133
Patented August 16, 1966

3,266,133
APPARATUS FOR DISPENSING AND ASSEMBLING
OPEN RINGS TO GROOVED SHAFTS
Theodore W. Kalbow, Berwyn, Ill., assignor to Western
Electric Company, Incorporated, New York, N.Y., a
corporation of New York
Filed Jan. 26, 1965, Ser. No. 428,046
12 Claims. (Cl. 29—211)

This application relates to an apparatus for automatically assembling fastening or retaining means on grooved or recessed elements, and, more particularly, to an apparatus for automatically feeding open rings and grooved shafts from bulk supplies thereof and for assembling the rings on the shafts.

Many types of equipment use open retaining rings seated in grooves or recesses on elongated elements, such as shafts, sleeves, rods, or pins, to provide means for retaining the elongated element in an assembled relationship with other parts, commonly parts having an opening through which the elongated element extends. These retaining rings are frequently small in size and are assembled on the elongated element or shaft by deflecting the free ends of the legs of the ring to permit the legs to pass around the groove or recessed portion of the shaft and to be retained in a position at least partially encircling the shaft as the legs are returned to their normal position by the inherent resilience of the material or metal from which the rings are made. The small size of the ring coupled with the relatively large amount of force required to deflect or spread the legs during the assembling operation make it quite difficult to quickly assemble shafts and rings using manual operations.

Accordingly, one object of the present invention is to provide an apparatus for easily and automatically assembling open retaining rings and elongated elements, such as shafts, pins, sleeves, or rods, having grooved or recessed areas for receiving the rings.

Another object is to provide an automatically operated apparatus for feeding shafts and rings and for assembling these components.

A further object is to provide an automatically operated shaft and open retaining ring assembling apparatus including a shaft transfer table movable between two spaced positions in one of which the shaft is fed to the table from a bulk supply thereof and in the second of which the shaft on the table is assembled with an open ring fed from a bulk supply thereof.

Another object is to provide an automatically operated shaft and ring assembling apparatus including an elongated shaft transfer table to which successive shafts from a bulk supply thereof are fed and which is movable from the shaft receiving position toward a ring inserting position in which the shaft receives a ring supplied from a ring magazine, the ring magazine being shifted to an ineffective position as the shaft on the table approaches the ring inserting position.

A further object is to provide an automatically operated ring and shaft assembling apparatus including a shaft transfer table movable between shaft receiving and ring mounting positions, a receptacle for automatically feeding successive shafts to the table from the shaft receiving position, retaining means for holding the shaft in position on the table during the insertion of the ring, a ring magazine for feeding successive rings to be mounted on the shafts, and means operated by the engagement of the retaining means by a shaft on the table for shifting the magazine assembly to an ineffective position.

In accordance with these and many other objects, an embodiment of the invention comprises an assembling apparatus for automatically feeding open retaining rings and grooved shafts from bulk supplies thereof and for assembling the retaining rings on the grooved or recessed portions of the shafts. This apparatus comprises a supporting structure defining a receptacle containing a plurality of grooved shafts which are adapted to be sequentially discharged from the receptacle through a discharge opening. The open retaining rings are disposed in a magazine assembly which is movably mounted on the supporting structure and which is adapted to feed successive rings to a ring locating or holding means disposed in a fixed position on the supporting structure. A shaft transfer table is mounted on the housing for movement from a first position disposed adjacent the discharge opening from the shaft receptacle to a second or ring inserting position in which the shaft is inserted in the retaining ring carried in the ring holding means. The magazine assembly includes a projecting portion which overlies the shaft on the transfer table and which is spaced from the table in the first position to permit a shaft to be supplied from the discharge opening to the transfer table. Thus, when the table is moved into its first position, a shaft is moved from the receptacle through the discharge opening to a position on the transfer table, suitable means being provided for aligning the grooved portion on the shaft with the retaining ring in the ring holding means.

When the table is then moved toward its second or ring inserting position, the shaft on the table bears against the resiliently biased retaining means which holds the shaft to be assembled in the properly located position. During continuing movement of the transfer table toward its second position, the grooved portion of the shaft is inserted in the retaining ring in the ring holding or positioning means. The engagement of the retaining means with the shaft on the transfer table serves to displace the magazine assembly so that this assembly is shifted away from the holding means and separates the bulk supply of retaining rings from the single ring that is being mounted on the grooved portion of the shaft.

The transfer table is then moved toward its first position, and, during this movement, an ejecting means which is effective during movement of the table from the ring inserting position to the shaft receiving position ejects the shaft containing the assembled ring from the transfer table. This prepares the transfer table to receive the next shaft to be assembled as it is moved to its first or shaft receiving position adjacent the discharge opening from the shaft receptacle. During this return movement of the transfer table, the magazine assembly is returned to its normal position so that pusher means provided therein supplies the next ring to be assembled to the ring position means. In this manner, each shaft and retaining ring are individually separated from the bulk supplies thereof and moved into an assembled relationship in response to shifting the transfer table between two spaced positions and without requiring time consuming manual operations.

Many other objects and advantages of the present invention will become apparent from considering the following detailed description in conjunction with the drawings in which:

FIG. 4 is an enlarged fragmentary sectional view similar to FIG. 4 illustrating the shaft and ring assembling apparatus in a shaft receiving position;

Referring now more specifically to the drawings, therein is illustrated an assembling apparatus 20 (FIGS. 1, 3, and 4) for automatically assembling or mounting an open retaining ring or fastener 22 (FIG. 12) in a grooved or recessed portion 24a on an elongated element, such as a shaft 24. The apparatus 20 comprises a supporting structure including a base plate 26 on which is mounted a shaft supply receptacle assembly indicated generally as 28 (FIG. 4) in which a plurality of the shafts 24 are disposed in generally parallel positions. Shaft conveying means in the supply receptacle assembly 28 including aligning or orienting means cooperating with the grooved portions 24a in the ends of the shafts 24 transport these shafts in sequence to a position adjacent a transfer table assembly indicated as 30. As each shaft 24 is mounted on the assembly 30, the shaft is disposed immediately beneath a ring 22 disposed in a ring positioning or holding assembly indicated generally as 32 (FIGS. 2 and 4).

To feed successive rings 22 to the holding or positioning assembly 32 for insertion or mounting on successive ones of the shafts 24, a magazine assembly 34 (FIGS. 1 and 3) is provided. The magazine assembly 34, which is movably mounted on the supporting structure for the apparatus 20, includes a strip of individual rings 22 which are biased toward the ring positioning assembly 32 so that the outermost ring 22 is received within the positioning assembly 32. A retaining structure rigidly secured to a forward portion of the magazine assembly 34 provides a retaining means for maintaining a shaft 24 on the transfer table assembly 30 during the insertion of the ring 22.

Figure 4:
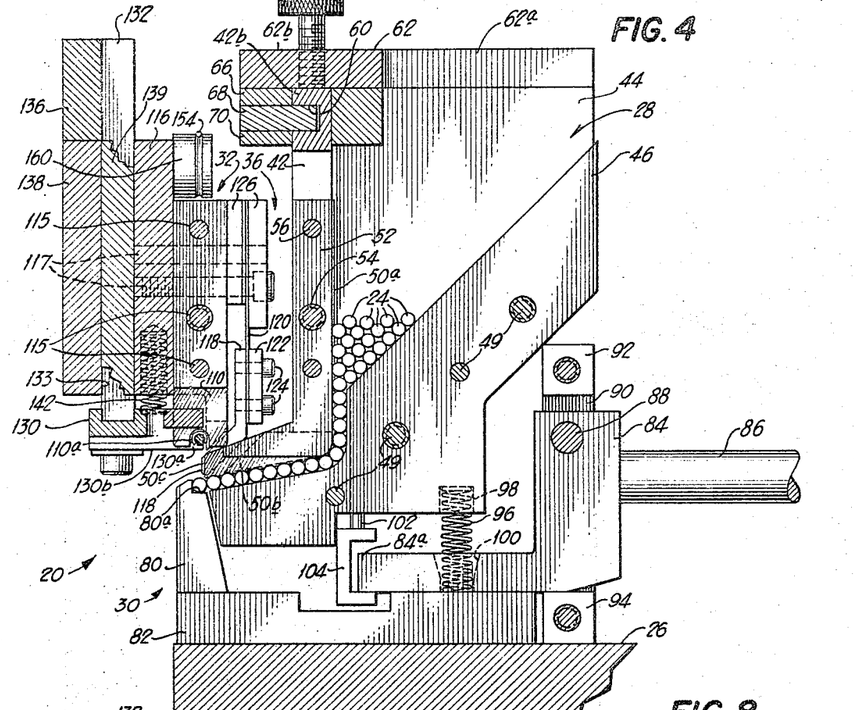
FIG. 4 is a sectional view taken along line 4—4 in FIG. 3.

When a ring 22 is to be assembled in the grooved portion 24a on a shaft 24, the transfer table assembly 30 is placed in the normal condition shown in FIG. 4 so that the outermost of the shafts 24 is discharged from the assembly 28 to be received on the table assembly 30. This assembly is then moved upwardly (FIG. 4) with the grooved portion 24a to receive the ring disposed immediately below a ring 22 disposed in the ring positioning assembly 32. During the upward movement of the transfer table assembly 30, the upper edge of the shaft bears against retaining means provided by the forward portion of the magazine assembly 34 and is retained in position on the table 30 thereby. During continuing upward movement of the transfer table 30, the grooved portion 24a of the shaft 24 is forced between the legs of the ring 22 and the clamping or retaining forward portion of the magazine assembly 34 is moved upwardly to cause a concurrent movement of the magazine assembly 34 to a position in which the remainder of the rings 22 in the strip thereof are separated from the single ring retained in the positioning assembly 32.

The transfer table assembly 30 is then moved downwardly to the position shown in FIG. 4. During the initial downward movement, the magazine assembly 34 is resiliently biased into its normal position, and the shaft 24 carrying the assembled ring 22 moves out of engagement with the clamping or retaining surface. At this time, the shaft 24 is engaged by an ejecting assembly 36 (FIG. 4) so that the assembled shaft 24 and ring 22 are ejected from the apparatus 20. As the transfer table assembly 30 reaches its normal position, the next shaft 24 to be assembled is discharged from the supply receptacle 28 to be received on the table assembly 30 in condition for the next cycle of operation.

The supply receptacle assembly 28 for receiving the plurality of elongated elements or shafts 24 is formed by a right side wall 40 (FIGS. 1, 2, and 3) which is rigidly secured to the base member 26 to form a part of the supporting structure, by a front wall 42 which is rigidly secured to the side wall 40, and by a left side wall 44 whose front edge is contiguous to the back surface of the front wall 42. A pair of shaft supporting elements 46 and 48 having upwardly and rearwardly inclined upper edges is secured to the inner surfaces of the walls 40 and 44, respectively, by suitable fasteners 49, such as threaded fasteners and dowels. The opposite ends of the lower layer of shafts 24 in the assembly 28 rest on the upper edges of the elements 46 and 48 so that the shafts move downwardly along the elements 46 and 48 and the back surface of the front wall 42 to collect in the throat of the receptacle shown in FIG. 4. The supply receptacle 28 includes a passageway or shaft guiding means extending from the throat at the lower end of the supply receptacle to a discharge opening disposed adjacent the transfer table assembly 30. This passageway includes a vertically extending portion defined between the back surface of the front wall 42 and the adjacent and rearwardly spaced, vertically extending edges of the elements 46 and 48. A generally horizontally extending and slightly downwardly inclined portion of the shaft guideway is defined, on its upper edge, by a forwardly projecting portion 42a (FIG. 2) on the front wall 42 and, on its lower edge, by forwardly projecting foot portions 46a and 48a on the elements 46 and 48, the upper surfaces of which incline downwardly. The left side wall 44 also includes a forwardly projecting and slightly downwardly inclined foot portion 44a which is disposed immediately adjacent the lower surface of the projecting portion 42a on the front wall 42. In this manner, the front wall 42 including the forwardly projecting portion 42a and the elements 46 and 48 with their forwardly projecting portions 46a and 48a define a downwardly and forwardly inclined passageway or conveying means for transporting the shafts 24 from the throat of the receptacle 28 to a discharge opening disposed immediately adjacent the transfer table assembly 30. The portions 42a, 46a, and 48a are spaced apart a distance substantially equal to the diameter of the shafts 24 so that only a single file of the shafts can pass through the discharge passageway.

The supply receptacle assembly 28 also includes means for insuring that the grooves 24a in the shafts 24 to receive the retaining rings 22 are properly aligned with the ring 22 held in the positioning assembly 32. To accomplish this, the right edge of the front wall 42 is spaced from the adjacent inner surface of the right side wall 40, and a pair of somewhat L-shaped elements or plates 50 and 52 are secured in this space between the right edge of the front wall 42 and the inner surface of the right side wall 40 by a threaded fastener 54 and a pair of dowels 56. The outer plate 52 comprises a spacer plate, and the inner plate 50 includes an edge 50a which projects rearwardly beyond the back surface of the front wall 42 to project into the cavity or chamber formed by the supply receptacle assembly 28. The position of the plate 50 is such that it is received within the groove 24a on the end of the shaft 24 that is to receive the ring 22. The edge 50a extends downwardly into the vertical portion of the discharge passageway and reduces the dimension of this passageway sufficiently that a shaft 24 cannot enter the passageway unless its grooved portion receives the projecting edge 50a.

The plate 50 also includes a lower forwardly extending foot portion 50b, the lower edge of which constitutes a continuation of the edge 50a and maintains the shafts 24 in their properly aligned position as they pass through the lower portion of the discharge passageway toward the discharge opening. Further, a front edge 50c on the foot portion 50b of the plate 50 engages the grooved portion 24a on the shaft 24 carried on the transfer table assembly 30 to insure that the shaft 24 remains in an aligned position as it is fed vertically toward the ring positioning assembly 32. Thus, the plate 50 insures that the groove 24a in the shaft 24 that is to receive the ring 22 remains in an aligned position during its movement from the supply receptacle 28 to the ring positioning assembly 32 in which the ring is inserted in the groove 24a.

The supply receptacle assembly 28 can also be adjusted for use with shafts 24 of different lengths. Since the aligning means including the plate 50 is disposed adjacent the grooves 24a in the right ends of the shafts 24, considered from the front of the apparatus 20, the left wall 44 is adjustably supported on the supporting structure for the apparatus 20. More specifically, the upper portion of the front wall 42, including a projecting portion 42b (FIGS. 1, 2, and 4) which rests on or in a slot in the upper edge of the right side wall 40, is provided with a transversely extending groove or recess 60. One leg 62a of a generally L-shaped bracket 62 is fixedly secured to the upper edge of the left side wall 44, and another leg 62b of the bracket 62 is disposed above and slidably rests on (FIG. 4) the upper edge of the front wall 42. A positioning element 64 is secured to the front leg 62b of the bracket 62 in a position depending from this leg and disposed adjacent the back surface of the front wall 42. Three plates 66, 68, and 70 are secured to the front portion of the front leg 62b of the bracket 62 adjacent the front surface of the front wall 42. The plate 68 is of greater width than the plates 66 and 70 so as to be slidably received within the groove 60. A plurality of thumb screws 72 are threadedly received within the front leg 62b of the bracket 62 in a position aligned with the top edge of the front wall 42 to provide means for securing the bracket 62 and thus the side wall 44 in an adjusted position relative to the front wall 42.

Accordingly, when the size of the supply receptacle assembly 28 is to be adjusted to condition the apparatus 20 for use with shafts 24 of a given length, the thumb screws 72 are loosened, and the bracket 62 and the connected side wall 44 are moved to the right or to the left (FIGS. 1 and 2) to a desired position relative to the right side wall 40 which is secured in a fixed position on the supporting base 26. Since the element 48 for supporting the left ends of the shafts 24 is carried on the left side wall 44 and since the front edges of the left side wall 44 and the projecting foot 44a lie immediately behind and below the adjacent surfaces of the front wall 42, the adjustment of the side wall 44 changes the width of the supply receptacle assembly 28 while maintaining the discharge passageway from this receptacle for feeding shafts 24 to the transfer table assembly 30. When the wall 44 has been adjusted to its desired position to accommodate the length of the shafts 24 to be assembled with the retaining rings 22, the thumb screws 72 are tightened to maintain the desired relationship.

Figure 2:
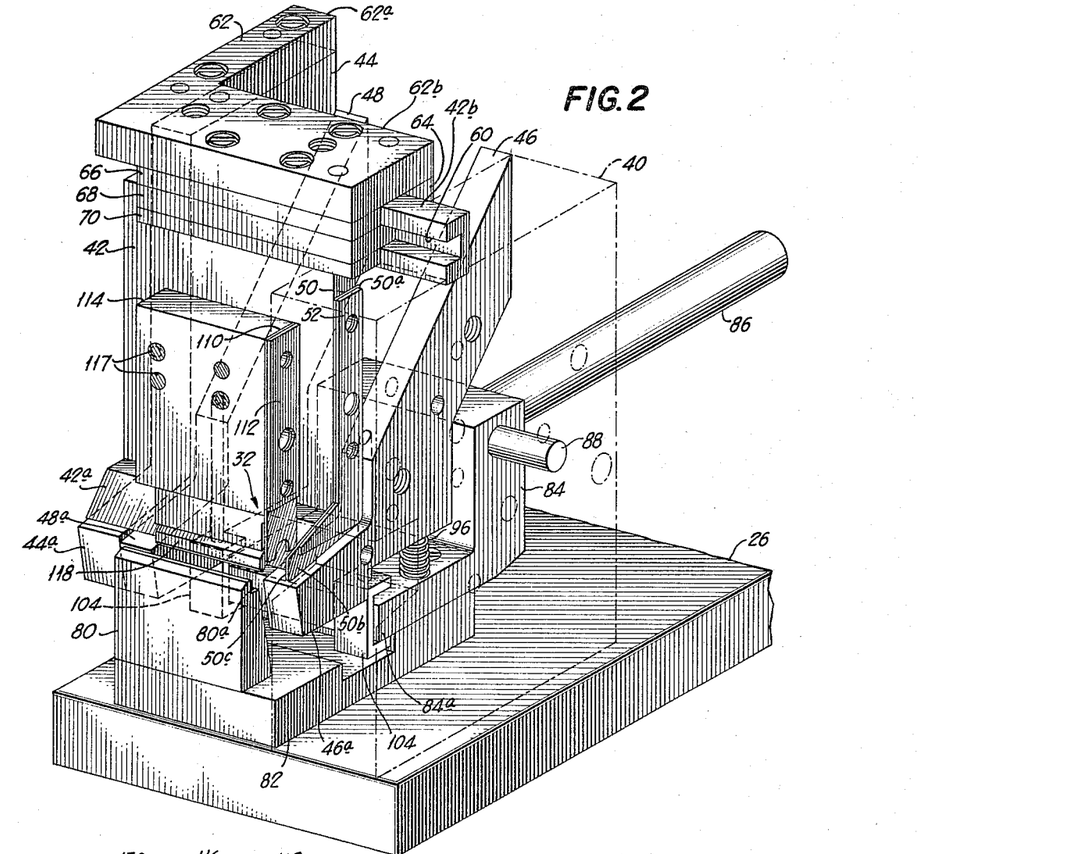
FIG. 2 is a fragmentary perspective view of the apparatus which is similar to FIG. 1 with portions of the structure removed.

Referring now more specifically to the transfer table assembly 30, this assembly receives the shaft 24 discharged from the supply receptacle 28 and transports it to a ring inserting position in which a ring supplied by the magazine assembly 34 is inserted in the groove 24a. During return movement of the transfer table assembly 30 to its normal position, the assembled shaft 24 and ring 22 are ejected by the assembly 36, and the next shaft 24 to be assembled with a ring 22 is received on the assembly 30 when this assembly reaches its normal or shaft receiving position. The assembly 30 includes a transfer table or bed member 80 which is secured to the upper surface of a plate 82 (FIGS. 2 and 4). A rear portion of the plate 82 is secured to a generally L-shaped member 84 to which a manual actuating handle 86 is secured. The upper end of the member 80 includes a notched portion 80a formed by a front upstanding wall disposed opposite the discharge opening from the passageway extending to the supply receptacle 28. The horizontally extending wall defining one side of the notch or recess 80a is wide enough to receive a single shaft 24 and, in combination with the front wall of this notch, secures the shaft 24 disposed on the member 80 against outward displacement and thus prevents more than a single shaft 24 from being discharged from the passageway extending to the supply receptacle 28.

The transfer assembly 30 is pivotally mounted on the supporting structure for the apparatus 20 by a shaft 88 (FIGS. 2 and 4) which is received at one end in a suitable recess in the right side wall 40. The other end of the shaft 88 is received in a vertically extending support 90 (FIGS. 3 and 4) which rests on the base 26 at its lower end and is secured to the right side wall 40 by two transversely extending members 92 and 94. A compression spring 96 (FIGS. 2 and 4) having its upper end disposed within a recess 98 in a lower wall of the element 96 and its lower end received within an opening 100 in the member 80 normally biases the assembly 30 to the position shown in FIG. 4 in which the lower surface of the member 82 rests on the upper surface of the base plate 26. When the lever or arm 86 is depressed, the connected members 80, 82, and 84 are pivoted in a clockwise direction about the shaft 88 so that the shaft 24 received in the notch 80a is elevated toward the ring positioning assembly 32 to receive a ring 22 in the groove 24a thereon. The assembly is restored to its normal position by a pivotal movement in a counterclockwise direction about the shaft 88 due to the resilient bias of the compression spring 96.

This pivotal movement of the transfer table assembly 30 also actuates means provided in the supply receptacle assembly 28 for insuring the free feeding of these shafts 24 through the discharge passageway. This means comprises a rod 102 secured at its lower end to a generally U-shaped member 104 within which is disposed a forwardly projecting end portion 84a on the member 84. The upper portion of the rod 102 is slidably disposed within an opening or bore in the member 46. The upper end of the rod 102, which is normally maintained in the position shown in FIG. 4, is provided with a taper corresponding to the degree of inclination of the upper edge of the member 46. A similar arrangement including a rod slidably mounted in a bore in the member 48 is provided, and this arrangement is shown primarily in dashed outline in FIG. 2. Because of the sliding connection between the member 104 associated with the element 48 and the actuating portion 84a of the member 84, the member 104 remains coupled to the member 84 when the left wall 44 is laterally adjusted in position in the manner described above.

When the transfer table assembly 30 is pivoted in a clockwise direction about the shaft 88, the projecting portion 84a of the member 84 engages the upper leg of both the U-shaped members 104 to move the two rods 102 upwardly so that the upper ends of these rods project into the receptacle 28. The elevation of the rods 102 engages both ends of any shafts 24 disposed in proximity to the discharge throat of the supply receptacle 28 to displace these shafts. When the assembly 30 is subsequently rotated in a counterclockwise direction to its normal position, the lower legs of the two U-shaped members 104 are engaged by the lower surface of the projecting portion 84a to retract the two rods 102. The fit between the rods 102 and the bores in the members 46 and 48 is such that these rods are retained in the position in which they are left by the positive actuation of the members 104. The intermittent projection of the rods 102 into the throat area of the supply receptacle 28 insures that the shafts 24 do not become bridged or otherwise lodged in a position in which feeding to the discharge passageway is prevented.

Figure 3:
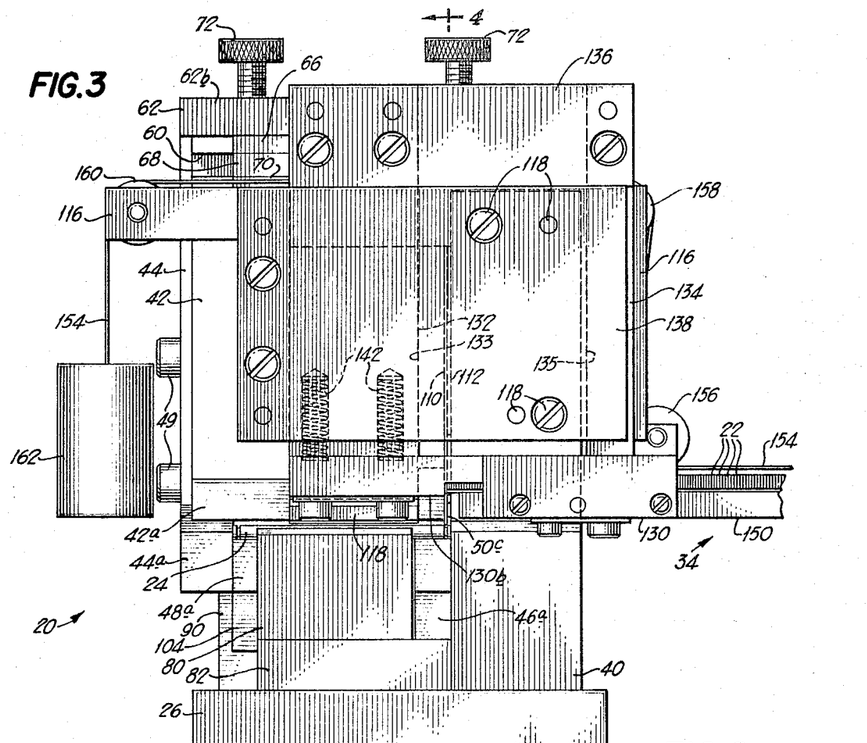
FIG. 3 is a front elevational view of the assembling apparatus.
Figure 11:
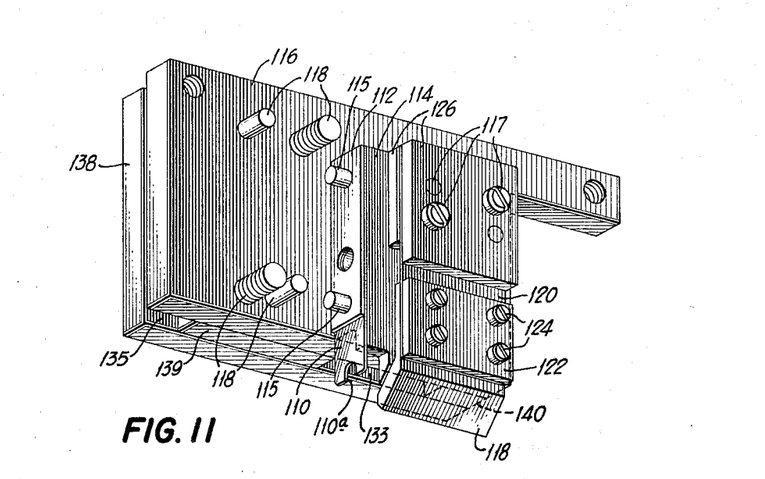
FIG. 11 is a rear perspective view of a ring positioning and shaft ejecting assembly.

The ring positioning assembly 32 which is sequentially supplied with a single ring 22 from the magazine assembly 34 is disposed generally above the transfer assembly 30 and retains the ring 22 in a position in which it is inserted into the groove 24a on the shaft 24 when the transfer table assembly 30 is actuated. The assembly 32 includes a thin metal plate 110 (FIGS. 2, 4, and 11) having a downwardly open notch 110a therein which is aligned with the strip of rings 22 in the magazine assembly 34 when this assembly is in its normal position. The plate 110 and a spacer plate 112 are secured between the right edge of a plate 114 and the inner surface of the right wall 40 of the supporting structure by a plurality of dowels and threaded fasteners 115. The plate 114 is also secured to a supporting plate 116 by dowels and threaded fasteners 117, and the plate 116, in turn, is secured to a front edge of the right wall 40 by suitable dowels and threaded fasteners 118 (FIGS. 3 and 11). Thus, the plate 110 in which the ring 22 is to be assembled is mounted in a fixed position on the supporting structure for the apparatus 20.

The ejecting assembly 36 (FIGS. 2, 4, and 11) for discharging an assembled ring 22 and shaft 24 from the transfer table assembly 30 during return movement of this assembly to its normal position is also mounted on the plate 112. The assembly 36 includes an angularly formed member 118 which is secured to the lower end of a flat spring or flexible member 120 by a backing plate 122 and a plurality of headed fasteners 124 (FIGS. 4 and 11). The upper end of the flat spring 120 is secured to the upper end of the plate 112 by a plurality of backing members 126 through which extend the dowels and threaded fasteners 117 used to secure the plate 114 to the plate 116.

In the normal condition of the assembly 36, the lower end of the angular member 118 projects slightly beyond the end portion 50c of the plate 50 (FIG. 4). Accordingly, when the transfer table assembly 30 is pivoted in a clockwise direction to elevate a shaft 24 carried in the recess 80a on the member 80, this shaft 24 bears against the end portion of the member 118 and displaces this member to the right by flexing the resilient member 120. The inner wall of the member 80 engages and holds the member 118 in this deflected position during subsequent elevation of the transfer tabel assembly 30. However, when the transfer assembly 30 is pivoted in a counterclockwise direction about the shaft 88 during movement to its normal position, a lower surface of the shaft 24 on which a ring 22 has been assembled bears against the upper edge of the free end of the angular member 118, and the resilient bias afforded by the member 120 tends to roll the shaft over the vertical wall of the notch 80a. Thus, as the member 80 is moved downwardly, the shaft 24 on which the ring 22 has been assembled rolls over the vertical wall and is discharged at the front of the machine into a suitable receptacle (not shown). Accordingly, the ejecting assembly 36 is not effective to discharge a shaft 24 carried on the member 80 during movement of this shaft toward the ring positioning assembly 32 but is effective to discharge an assembled shaft 24 and ring 22 during the oppositely directed movement of the transfer table assembly 30 following the assembling operation. The removal of the assembled shaft 24 and ring 22 permits the next shaft 24 to be assembled to be received in the notch 80a when the transfer table assembly 30 reaches its normal position.

Figure 7:
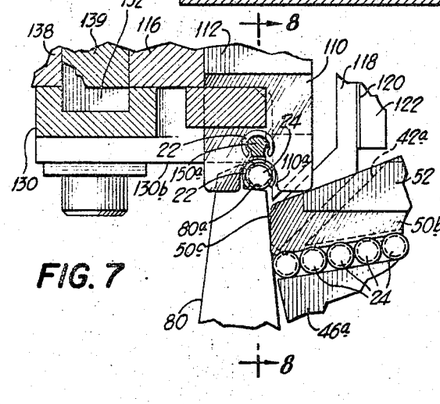
FIG. 7 is a fragmentary sectional view similar to FIG. 5 illustrating the apparatus in a ring inserting position.

More specifically, when the transfer table assembly 30 is pivoted in a clockwise direction about the shaft 88 to elevate the member 80, the right hand wall of the member 80 (FIG. 4) moves in front of the next shaft 24 to be discharged from the passageway extending to the supply receptacle 28 so that no shafts can be discharged when the transfer table assembly 30 has been displaced from its normal position (see FIG. 7). However, when the assembly 30 is restored to its normal position shown in FIGS. 4 and 5, the assembled shaft 24 and ring 22 having been ejected by the assembly 36, the lowering of the right hand wall of the member 80 from a position intersecting the discharge opening frees the end shaft to be displaced downwardly by the weight of the other shafts 24 in the passageway, and this outermost shaft rolls or slides into the notch 80a in which it serves as a stop to prevent further movement of the shafts during the period in which the transfer table assembly 30 remains in its normal position.

Figure 10:
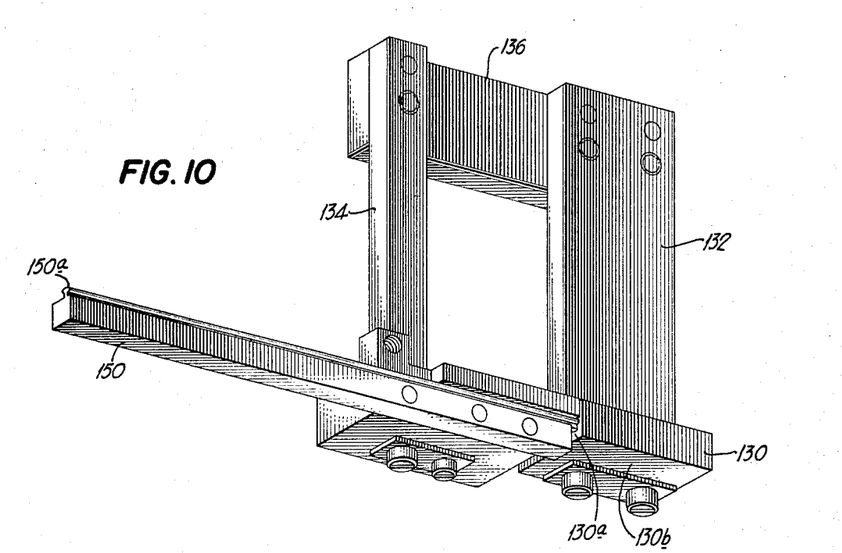
FIG. 10 is a rear perspective view of a ring magazine assembly and sliding supporting means therefor.

To provide means for retaining the shaft 24 seated in the notch 80a during the interval in which the ring 22 is inserted and to also provide a stop surface for locating a ring 22 in the notch 110a of the positioning assembly 32, a member 130 is provided having a vertical wall surface 130a (FIGS. 4 and 10) disposed immediately to the right of (FIG. 10) or behind (FIG. 4) the plate 110 adjacent the notch 110a. The end ring 22 supplied by the magazine assembly 34 engages the wall surface 130a when disposed within the notch 110a. The member 130 also includes a lower wall surface 130b (FIGS. 4 and 10), a portion of which is disposed immediately above the shaft 24 in the notch 80a. When the transfer table assembly 30 is moved upwardly, the lower wall 130b bears against the upper surface of the shaft 24 to hold this shaft seated in the notch 80a during the interval in which the ring 22 is inserted in the groove 24a. The member 130 is movably mounted on the supporting structure for the apparatus 20 so that the stop wall surface 130a and the retaining or clamping wall surface 130b can be moved upwardly as the shaft 24 is moved into the notch 110a.

More specifically, the member 130 is secured to the lower ends of two rails 132 and 134 (FIGS. 1 and 10), the upper ends of which are joined and connected to a plate 136. The rails 132 and 134 run in two guideways or channels 133 and 135 (FIG. 11) defined by and between the plate 116 and a front plate 138. The front plate 138 is secured to the plate 116 in a spaced position with a pair of spacer plates 139 and 140 (FIGS. 1 and 11) disposed therebetween. A pair of compression springs 142 (FIG. 4) whose upper ends are received in openings in the plate 116 and whose lower ends are received in recesses or openings in the member 130 normally biases the member 130 to the position shown in FIG. 4 which is determined by engagement of the lower edge of the plate 136 with the upper edge of the plate 138. When the upper edge of the shaft 24 on the member 80 engages the lower wall surface 130b during elevation of the assembly 30, continuing upward movement elevates the member 130 and structures connected thereto against the resilient bias of the springs 142 so that the stop surface 130a and the clamping wall 130b are moved upwardly to permit the grooved portion of the shaft 24 to enter the opening 110a in the plate 110. As the transfer table assembly 30 is moved downwardly, the compression springs 142 lower the member 130 in synchronism therewith until the shaft 24 moves out of engagement with the lower wall surface 130b. This frees the shaft 24 for movement under the control of the member 118 in the ejector assembly 36 so that the assembled shaft 24 and ring 22 can be ejected from the apparatus 20.

The member 130 also provides a movable support for the magazine assembly 34 so that this assembly is moved into and out of position in which a ring 22 can be fed into the opening 110a in the ring positioning assembly 32. The magazine assembly 34 includes a rail 150 (FIGS. 1, 3 and 10) secured to an inner wall surface of the member 130. The rail 150 includes a somewhat circular or arcuate rib 150a extending along its upper wall on which a strip of the rings 22 are slidably mounted. These rings generally are supplied in a form in which they are adhered together in a strip by an adhesive backing. This backing can be removed from the rings 22 following their insertion on the rib 150a of the rail 150.

To provide means for biasing the strip of rings 22 to the left (FIGS. 1 and 3) a pusher 152 is provided which is slidably mounted on the rail 150 and which engages the rearmost ring 22 in the strip thereof. To provide a bias for the pusher 152, the pusher is connected to a flexible cord 154 which passes over three spaced pulleys 156, 158, and 160 and is connected at its other end to a weight 162 spaced from the supporting structure 26. The pulleys 158 and 160 are pivotally mounted on the plate 116, and the pulley 156 is pivotally mounted on the member 130.

In the normal condition of the apparatus 20, the bias supplied to the pusher 152 by the weight 162 forces the end ring 22 in the strip thereof off the left end of the rail 152 into a position abutting the wall 130a and disposed within the opening 110a in the plate 110. Since the magazine assembly 34 is mounted on the member 130, the upwardly directed movement of this member as a result of engagement with the shaft 24 when the transfer table assembly 30 is elevated moves the magazine assembly 34 including the rail 150 upwardly as the shaft 24 enters the opening 110. This separates the end ring from the remaining rings in the strip. However, the separated ring 22 disposed within the opening 110 is forced into the groove 24a on the end of the shaft 24. When the transfer table assembly 30 is lowered, the member 130 moves downwardly in the manner described above so that the end ring 22 in the strip which is biased against the adjacent surface of the plate 110 in the elevated position of the magazine assembly 34 drops into alignment with the opening 110a and is moved into this opening an amount determined by the engagement of the adjacent stop surface 130a.

Figures 1, 12:
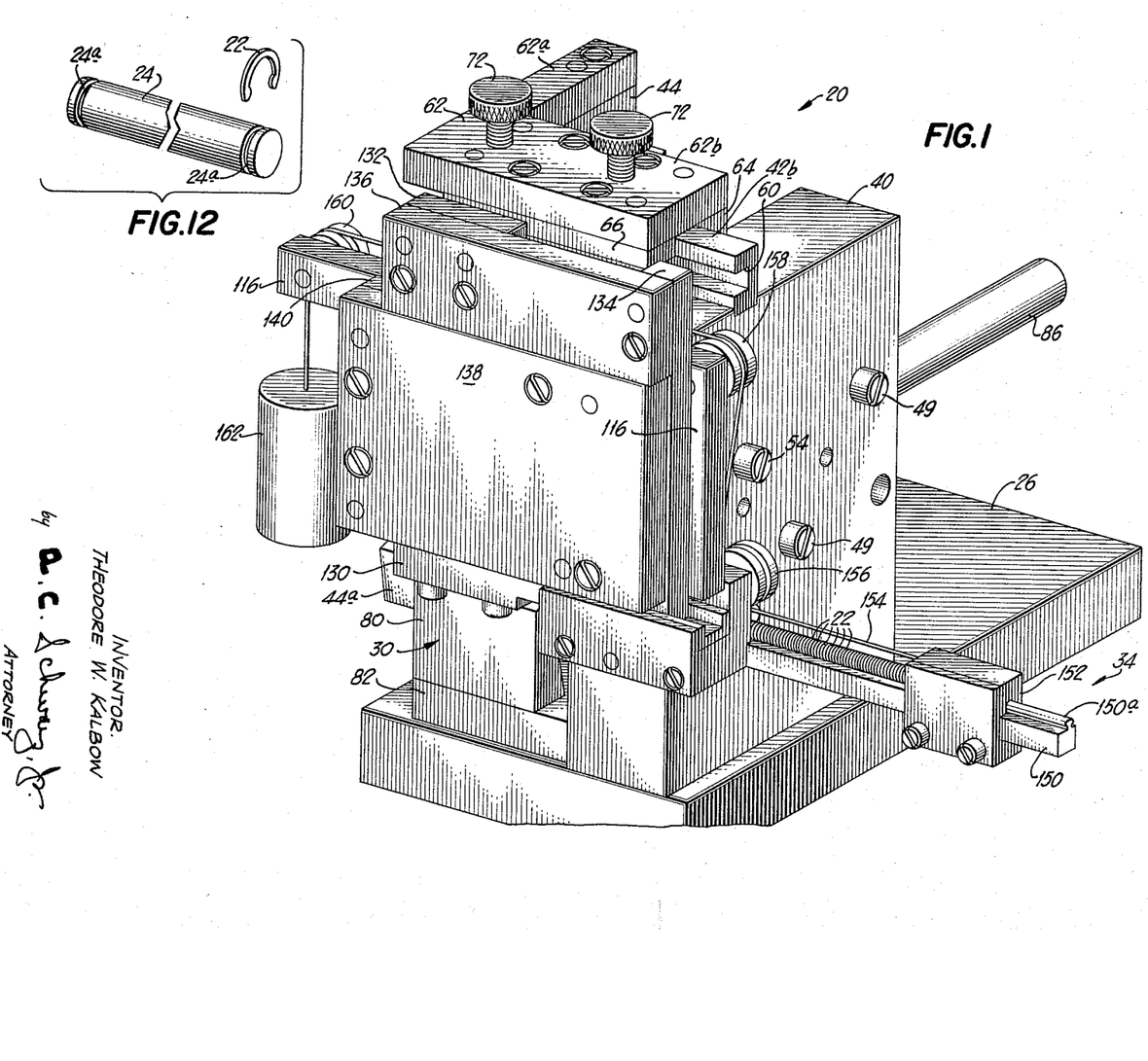
FIG. 1 is a perspective view of a shaft and ring assembling apparatus embodying the present invention.
FIG. 12 is an exploded perspective view of a shaft and retaining ring with which the apparatus of the present invention can be used.

When the apparatus 20 is to be placed in operation, a strip of rings 22 is placed on the rail with the rib 150a disposed within a somewhat circular cavity formed by the strip, and the pusher 152 is released to bias the strip toward the left (FIGS. 1 and 3). The end ring 22 is disposed within the opening 110a and engages the stop wall surface 130a. The thumb screws 72 are loosened to permit the wall 44 to be adjusted to a position commensurate with the length of the shafts 24 on which the rings 22 are to be assembled. Following this adjustment, the thumb screws 72 are tightened to maintain the shaft supply receptacle 28 in its desired setting. A supply of shafts 24 is then placed in the receptacle 28 with their ends resting on the upper edges of the inclined elements 46 and 48. The shafts 24 move downwardly to the throat defined by the rear surface of the front wall 42 and the upper edges of the member 46 and 48 and then pass downwardly through the vertical portion and the horizontally extending portion of the discharge passageway, the shafts 24 being aligned by engagement of the grooves 24a therein with the projecting edge 50a of the aligning plate 50. The end shaft 24 passes completely through the passageway and is discharged through a discharge opening to be received in the notch 80a on the member 80 in the transfer table assembly 30.

Figure 5:
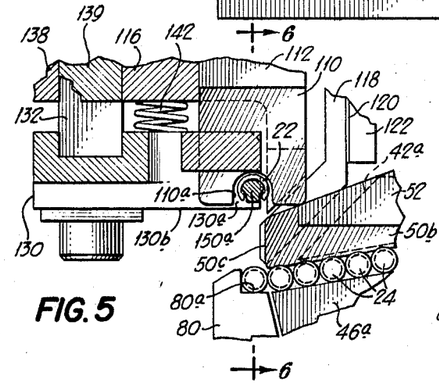
Figure 6:
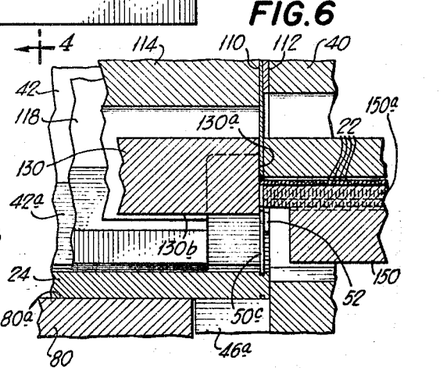
FIG. 6 is an enlarged fragmentary sectional view taken along line 6—6 in FIG. 5.
Figure 8:
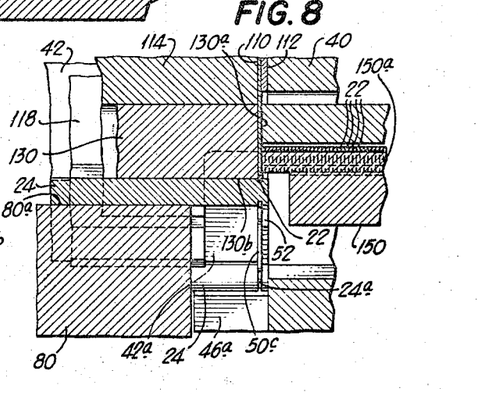
FIG. 8 is a sectional view taken along line 8—8 in FIG. 7.

To assemble the first shaft 24 and ring 22, the transfer table assembly 30 is pivoted, by depressing a handle 86, in a clockwise direction about the shaft 88 from the normal position shown in FIGS. 5 and 6 toward the ring inserting position shown in FIGS. 7 and 8. During this movement, the groove 24a in the shaft 24 engages the edge 50c of the guide plate 50 so that this groove is retained in a position aligned with the plate 110. Further, the engagement of the end of the angularly formed member 118 in the ejection assembly 36 deflects this member to the right (FIG. 4) to permit upward movement of the shaft 24 and the member 80. This upward movement of the member 80 also obstructs the discharge opening for the passageway to the receptacle 28 to prevent additional shafts 24 from leaving this passageway. When the member 80 has been elevated to the point at which its upper surface engages the lower wall 130b of the member 130, the member 130 moves upwardly against the action of the springs 142 so that the lower wall 130b provides resiliently biased means for retaining the shaft 24 in the notch 80a during subsequent upwardly directed movement of the transfer table assembly 30. This upwardly directed movement of the transfer table assembly 30 also elevates the magazine assembly 34 so that the end ring disposed within the opening 110a is separated from the remaining rings, and the outer ring remaining in the strip slides against the smooth surface of the member 110. During this movement, the shaft 24 enters the opening 110a, and the ring 22 disposed therein is forced into the groove 24a. Engagement of the upper surface of the member 130 with the lower edges of the plates 114, 116, and 138 limits the upwardly directed movement of the transfer table assembly 30. During this movement, the projecting portion 84a of the member 84 actuates the rods 102 to agitate the shafts 24 in the supply receptacle 28.

Figure 9:
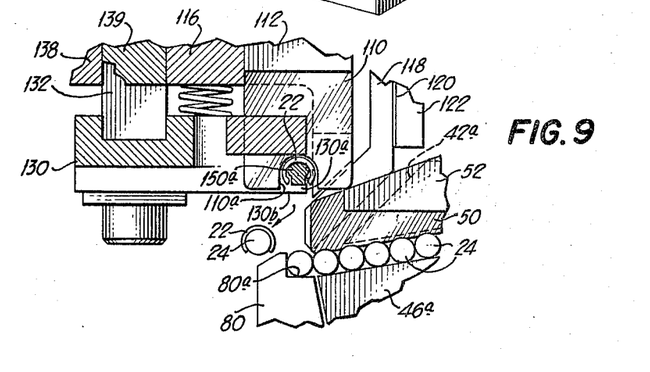
FIG. 9 is an enlarged fragmentary sectional view similar to FIGS. 5 and 7 illustrating the apparatus in a position for ejecting an assembled shaft and ring.

When the lever 86 is released, the compression spring 96 pivots the transfer table assembly 30 in a counterclockwise direction about the shaft 88 so that the member 80 is lowered. During the initial downwardly directed movement of the member 80, the member 130 is moved downwardly by the compression springs 142. This moves the magazine assembly 34 downwardly to a position in which the next ring 22 is inserted into the opening 110a. Further, the lower surface of the shaft 24 in the notch 80a engages the upper surface of the resiliently biased member 118. The force provided by the member 118 tends to rotate the shaft 24 relative to the vertical wall defining the notch 80a so that when the shaft has cleared the wall surface 130b, the shaft 24 carrying the assembled ring 22 rolls over the obstruction at the upper end of the member 80 (FIG. 9) to be discharged from the apparatus 20. As the member 80 returns to its normal position, the right hand wall surface of the member 80 clears the discharge opening of the passageway extending to the receptacle 28, and the next shaft 24 rolls into the notch 80a. Thus, by repeatedly actuating the handle 86, successive shafts 24 are automatically fed from the supply receptacle 28 and assembled with rings 22 successively supplied from the magazine assembly 34.

Although the present invention has been described with reference to a single illustrative embodiment thereof, it should be understood that numerous other modifications and embodiments can be devised by those skilled in the art that will fall within the spirit and scope of the principles of this invention.

What is claimed and desired to be secured by Letters Patent of the United States is:

1. An apparatus for assembling open rings on grooved elongated elements comprising
    a receptacle for receiving a plurality of elongated elements disposed in generally parallel relation,
    structure defining an element conveying path for discharging elongated elements from the receptacle in sequence,
    a movably mounted element receiving means movable between a first position disposed in the path to receive an elongated element from the conveying path and a second position spaced from the first position,
    ring holding means spaced from the element receiving means in its first position and adapted to mount a ring in a position in which the ring receives the elongated element when the element receiving means is in its second position to mount the ring on the elongated element,
    and means movable into the path in a timed relation with the movement of the element receiving means away from its first position for engaging at least one of the elongated elements in the path to prevent the discharge of an elongated element from the conveying path when the element receiving means is not in its first position.

2. An apparatus for assembling open rings on grooved elongated elements comprising
    a receptacle for receiving a plurality of elongated elements disposed in generally parallel relation,
    structure defining an element conveying path communicating with the receptacle for discharging elongated elements from the receptacle in sequence, guiding means in the conveying path and adapted to be received in the grooves on the elongated elements for holding the elongated elements in predetermined aligned positions during movement over the conveying path, a movably mounted element receiving means movable between a first position disposed in the path to receive an elongated element from the conveying path and a second position spaced from the first position, and ring holding means aligned with the guiding means and spaced from the element receiving means in its first position for mounting a ring in a position in which the ring receives the elongated element to mount the ring on the elongated element when the element receiving means is in its second position.

3. An apparatus for assembling open rings on grooved elongated elements of various lengths comprising structural means forming a receptacle for receiving a plurality of elongated elements disposed in generally parallel relation and a conveying path for discharging elongated elements from the receptacle in sequence, said structural means including both a fixed structure and a movable structure, the movable structure forming a part of both the receptacle and the conveying path, means for securing said movable structure in a desired position relative to the fixed structure in accordance with the length of the elongated elements on which the rings are to be assembled, a movably mounted element receiving means movable between a first position disposed adjacent one end of the conveying path to receive an elongated element from the conveying path and a second position spaced from the first position, and ring holding means spaced from the element receiving means in its first position and adapted to mount a ring in a position in which the ring receives the elongated element when the element receiving means is moved to its second position.

4. An apparatus for assembling open rings on grooved elongated elements comprising, a receptacle for receiving a plurality of elongated elements disposed in generally parallel relation, structure defining an element conveying path extending from the receptacle to an open end for discharging elongated elements from the receptacle in sequence, a movably mounted element receiving means movable between a normal position disposed adjacent the open end to receive an elongated element from the conveying path and a displaced position spaced from the normal position, ring holding means spaced from the element receiving means in its normal position and adapted to at least partially receive the elongated element when the element receiving means is in its displaced position to mount a ring on the elongated element, and means movable into engagement with the elongated element during movement of the element receiving means from its displaced position toward its normal position to eject the elongated element from the element receiving means and prepare the element receiving means to receive the next elongated element from the conveying path.

5. The apparatus set forth in claim 4 including a magazine assembly for feeding rings to the ring holding means, means mounting the magazine assemby for movement from a first position adjacent the ring holding means to a second position spaced from the first position, and means responsive to movement of the element receiving means toward its displaced position for moving the magazine assembly from the first position to the second position.

6. The apparatus set forth in claim 4 including means in the conveying path for engaging the grooved portions of the elongated elements to locate the elongated elements in proper position on the element receiving means.

7. An apparatus for assembling open rings on grooved shafts comprising a supporting structure, a ring holding means for detachably mounting a single ring in a given position on the supporting structure with the opening therein facing in a predetermined direction, an elongated transfer table pivotally mounted on the structure for pivotal movement from a first position to a second position in said predetermined direction and from the second position to the first position, a receptacle for receiving a plurality of the shafts disposed in generally parallel relation to each other and to the elongated transfer table, said receptacle including a discharge opening disposed adjacent the transfer table when the transfer table is disposed in its first position, ejecting means operative during movement of the transfer table from the second position to the first position for engaging a shaft and for discharging the shaft from the transfer table, and actuating means connected to the transfer table for moving the table from the first position to the second position to move a shaft on the table into the ring carried on the ring holding means and for moving the table from the second position to the first position in which the next shaft is automatically transferred to the table from the receptacle through the discharge opening, the shaft having the ring mounted therein being discharged from the table by the ejecting means during the movement of the transfer table from the second position to the first position.

8. An apparatus for automatically assembling open rings on grooved or recessed elongated elements comprising supporting means, receptacle means on the supporting means for receiving a plurality of the elongated elements and including an elongated element discharge means, transfer means mounted on the supporting means and movable from a first position adjacent the discharge means in which it receives an elongated element to a spaced second position, ring positioning means spaced from the transfer means in its first position and adapted to mount a ring on the elongated element when the transfer means is in its second position, ring feeding means for feeding successive single rings to the ring positioning means, retaining means for retaining an elongated element on the transfer means, a supporting structure slidably mounted on the supporting means, and means mounting the ring feeding means and the retaining means on the supporting structure in a position in which the retaining means engages the element on the transfer means during its movement toward the second position, the ring feeding means and the retaining means moving with the transfer means following engagement between the element and the retaining means.

9. An apparatus for mounting an open retaining ring in a groove on an elongated element comprising a supporting structure, a ring receiving means mounted in a fixed position on the supporting structure, a magazine assembly adapted to receive a plurality of the rings and including means for feeding the end ring into the ring receiving means, means mounting the magazine assembly for movement on said structure from a normal position in which the ring can be fed to the ring receiving means to a displaced position in which a ring in the receiving means is spaced from the remaining rings in the magazine assembly, element receiving means for receiving an elongated element with the groove aligned with the opening in the ring in the ring receiving means, retaining means movably mounted on the structure and normally spaced from the element receiving means, means for moving the element receiving means toward the retaining means and the ring receiving means so that the elongated element is clamped in position by the retaining means, continuing movement of the element receiving means toward the ring receiving means forcing the ring in the ring receiving means into the groove and causing movement of the retaining means, and means connected between the retaining means and the magazine assembly and responsive to movement of the retaining means for shifting the magazine assembly to its displaced position to prevent engagement of the magazine assembly or the rings therein by the elongated element.

10. An apparatus for automatically assembling open rings or elongated elements comprising a supporting structure having a guideway for feeding a plurality of the elongated elements disposed in generally parallel positions to a guideway discharge, a ring receiving means carried in a fixed position on the supporting structure, a magazine assembly for receiving a plurality of open rings disposed in aligned positions generally parallel to and spaced from the elongated elements in the element receiving means, said magazine assembly comprising a generally rigid structure mounted on the supporting structure for movement between a normal position and a displaced position and having biasing means for feeding a ring into the ring receiving means when the magazine assembly is in its normal position, an elongated element receiving means disposed adjacent the guideway to receive successive elongated elements, said element receiving means being mounted on the supporting structure for movement between a normal position adjacent the guideway discharge in which it receives an elongated element from the guideway and a displaced position spaced from the guideway discharge in which the elongated element receives a ring from the ring receiving means, and drive means for moving the magazine assembly and the element receiving means between their normal and displaced positions in a timed relation to each other to automatically feed successive elongated elements to the element receiving means, to feed successive rings to the ring receiving means, and to assemble successive rings held in the ring receiving means on successive elongated elements supplied to the element receiving means.

11. An apparatus for assembling an open ring on a grooved and axially elongated shaft comprising
a supporting structure, a receptacle on the structure for receiving a plurality of the shafts disposed in generally parallel positions, means on the structure defining a shaft conveying passageway opening at one end in the receptacle and having a discharge opening at its other end, the shafts being adapted to move through the passageway in a direction transverse to their axis of elongation, an elongated shaft transfer table movably mounted on the structure for movement between a first position in which it is aligned with the discharge opening and a second position spaced from the first position, resiliently biased retaining means spaced from the transfer table in its first position a distance great enough to permit movement of a shaft from the discharge opening onto the table, ring holding means for removably holding a ring in a position spaced from the transfer table and with the ring opening oriented to receive a shaft carried on the transfer table when the table is located in its second position, and actuating means for moving the transfer table from the first position toward the second position and then from the second position to the first position, the shaft on the transfer table being held in position on the table by the retaining means as the table moves toward the second position and the grooved portion of the shaft being inserted into the ring when the table reaches the second position, the shaft on the table carrying the assembled ring being released by the retaining means as the table returns to the first position to permit the assembled shaft and ring to be replaced by an additional shaft from the discharge opening when the table reaches the first position.

12. The apparatus set forth in claim 11 including
a magazine assembly for automatically feeding successive rings from a supply thereof to the ring holding means, means movably mounting the magazine assembly on the structure, and means actuated by the actuating means for moving the magazine in synchronism with movement of the transfer table between a position adjacent the holding means in which a ring can be supplied to the ring holding means and a position spaced from the holding means in which the magazine assembly is ineffective to supply rings to the ring holding means.

References Cited by the Examiner

UNITED STATES PATENTS

| | | | |
|---|---|---|---|
| 1,616,641 | 2/1927 | Tainter | 29—211 X |
| 2,870,529 | 1/1959 | Erdmann | 29—229 |
| 2,895,214 | 7/1959 | Erdmann | 29—229 |
| 2,906,011 | 9/1959 | Focht | 29—211 |
| 2,930,114 | 3/1960 | Erdmann | 29—229 |
| 2,966,739 | 1/1961 | Kalbow | 29—211 |
| 2,978,801 | 4/1961 | Erdmann | 29—212 |

CHARLIE T. MOON, *Primary Examiner.*

THOMAS H. EAGER, *Examiner.*